United States Patent
Thompson, Jr. et al.

[11] Patent Number: 5,888,669
[45] Date of Patent: Mar. 30, 1999

[54] TRANSITION METAL-BASED CERAMIC MATERIAL AND ARTICLES FABRICATION THEREFROM

[75] Inventors: Levi T. Thompson, Jr., Northville; Michael R. Wixom, Ann Arbor, both of Mich.

[73] Assignee: T/J/ Technologies, Northville, Mich.

[21] Appl. No.: 818,337

[22] Filed: Mar. 14, 1997

Related U.S. Application Data

[60] Provisional application No. 60/013,420, Mar. 14, 1996 and provisional application No. 60/023,235, Aug. 21, 1996.

[51] Int. Cl.⁶ .................................................. H01M 4/58
[52] U.S. Cl. ........................ 429/218; 423/276; 423/324; 423/351; 423/414; 205/59; 501/93; 501/154
[58] Field of Search ........................ 501/93, 96.1, 96.3, 501/154; 423/276, 324, 351, 414; 429/218; 205/59; 502/177, 200, 202, 204, 232

[56] References Cited

U.S. PATENT DOCUMENTS

| | | | |
|---|---|---|---|
| 3,549,402 | 12/1970 | Whitney et al. | 501/96.1 |
| 4,148,964 | 4/1979 | Fedoseev et al. | 428/403 |
| 4,551,316 | 11/1985 | Iizuka | 423/276 X |
| 4,886,772 | 12/1989 | Prada-Silva et al. | 502/200 |
| 5,110,696 | 5/1992 | Shokoohi et al. | 429/218 |
| 5,256,608 | 10/1993 | Dubensky et al. | 501/94 |
| 5,294,503 | 3/1994 | Huang et al. | 423/324 X |
| 5,358,801 | 10/1994 | Brodd | 429/215 |
| 5,556,721 | 9/1996 | Sasaki et al. | 429/218 |
| 5,589,298 | 12/1996 | Takada et al. | 429/218 |
| 5,702,843 | 12/1997 | Mitate et al. | 429/218 |

OTHER PUBLICATIONS

Sathya S. Prasad, "Insertion Materials for Rechargeable Lithim Betteries," *Handbook of Solid State Batteries & Capacitors,* World Sientific. (Date Unknown).

*Primary Examiner*—Stephen Kalafut
*Attorney, Agent, or Firm*—Gifford, Krass, Groh, Sprinkle, Anderson & Citkowski, P.C.

[57] ABSTRACT

A non-oxide, transition metal based ceramic material has the general formula $A_y M_2 Z_x$, wherein A is a group IA element, M is a transition metal and Z is selected from the group consisting of N, C, B, Si, and combinations thereof, and wherein $x \leq 2$ and $y \leq 6-x$. In these materials, the group IA element occupies interstitial sites in the metallic lattice, and may be readily inserted into or released therefrom. The materials may be used as catalysts and as electrodes. Also disclosed herein are methods for the fabrication of the materials.

23 Claims, 3 Drawing Sheets

5,888,669

TRANSITION METAL-BASED CERAMIC MATERIAL AND ARTICLES FABRICATION THEREFROM

RELATED APPLICATIONS

This patent application claims the priority of provisional patent application Ser. No. 60/013,420 filed Mar. 14, 1996, entitled "High Surface Area Non-Oxide Ceramic Electrodes for Advanced Batteries;" and provisional patent application Ser. No. 60/023,235 filed Aug. 21, 1996, entitled "Non-Oxide Transition Metal-Based Ceramic, and Articles Fabricated Therefrom."

FIELD OF THE INVENTION

This invention relates generally to synthetic materials. More specifically, the invention relates to ceramic materials, and in particular to non-oxide ceramic materials comprised of transition metals in combination with one or more of nitrogen, carbon, boron, and silicon, and optionally with a group IA element intercalated therein. The invention further relates to methods for fabricating these materials, and for devices made therefrom.

BACKGROUND OF THE INVENTION

The present invention relates to a novel class of non-oxide, transition metal based ceramics which are capable of intercalating group IA elements therein. These materials have utility as electrodes for batteries, fuel cells, capacitors, electrochromic displays and the like. They may also be used as elements in semiconductor devices, as catalysts, and as structural elements in a variety of specialized devices.

The materials of the present invention are described as being non-oxide ceramics, and within the context of this disclosure the term is meant to refer to compounds of transition metals having one or more of boron, carbon, nitrogen and silicon occupying a number of interstitial sites in their crystalline lattice. As such, they are distinguished from prior art oxide based ceramics. It is to be understood that in some instances, the materials of the present invention may include some minor proportions of oxygen therein, either as a native oxide formed on the surface thereof, or as a minor proportion of oxygen occupying internal sites of the bulk material. Nonetheless, the properties of the materials of the present invention are attributable to the non-oxygen components thereof, and as such, it will be understood that non-oxide ceramics, as defined herein, may include some small portions of oxygen therein.

It is notable that the materials of the present invention can incorporate group IA elements therein. The group IA elements occupy interstitial sites in the lattice, and may be readily inserted and removed therefrom and such insertion and removal is referred to herein as intercalation. It is further to be noted that as used herein, the term group IA elements is meant to refer to hydrogen group elements of the periodic table.

The materials of the present invention are capable of intercalating large amounts of hydrogen or lithium in relatively small volumes, therefore, they have significant utility as electrodes for batteries, sensors and the like, and as catalysts. The materials of the present invention are low in cost and environmentally benign. Furthermore, they have high electrical conductivities, compared to other ceramics, and manifest good thermal stability. It has been found that the electrochemical potential of these materials can be controlled by varying their stoichiometry, and this feature is significant, insofar as it permits manufacture of electrochemical cells having a controlled discharge profile.

Previously, oxide based ceramic materials have been employed as battery electrodes, and one particular lithium ion battery electrode utilizing oxide based ceramics is disclosed in U.S. Pat. No. 5,110,696. Another such oxide based battery electrode is disclosed in U.S. Pat. No. 5,358,801.

As will be explained hereinbelow, the mechanical, chemical and electrical properties of the materials of the present invention distinguish them from prior art ceramics, and greatly enhance their utility as catalysts, electrodes, and the like.

Also disclosed herein are some novel methods for the fabrication of the materials of the present invention. These and other advantages of the present invention will be readily apparent from the drawings, discussion and description which follow.

BRIEF DESCRIPTION OF THE INVENTION

There is disclosed herein a transition metal based ceramic material having the general formula $A_yM_2Z_x$, wherein A is a group IA element, M is a transition metal, and Z is a member selected from the group consisting of: N, C, B, Si, and combinations thereof; and wherein $x \leq 2$ and $y \leq 6-x$.

In particular embodiments, the material has a cubic, tetragonal or hexagonal lattice structure, and in some instances, A and Z occupy interstitial sites in said lattice.

In some embodiments the group IA element is lithium, and in other embodiments the transition metal is selected from groups IIIB–VIIB of the periodic table. In some specific embodiments, the transition metal is selected from groups IVB–VIB of the periodic table.

There is also disclosed herein electrochemical electrodes and catalytic bodies fabricated from the group IA containing transition metal based ceramic. Also disclosed herein are electrodes fabricated from a powder comprised of a compound of a transition metal and members selected from the group consisting of N, C, B, Si, and combinations thereof, in which the surface area of the powder is in excess of 5 $m^2/g$.

Also disclosed herein are methods for manufacturing the materials of the present invention. In some instances, materials are fabricated by electrochemically adding a group IA element into a transition metal containing intermediate. In other instances, materials are fabricated by chemically reacting an intermediate with a reagent.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
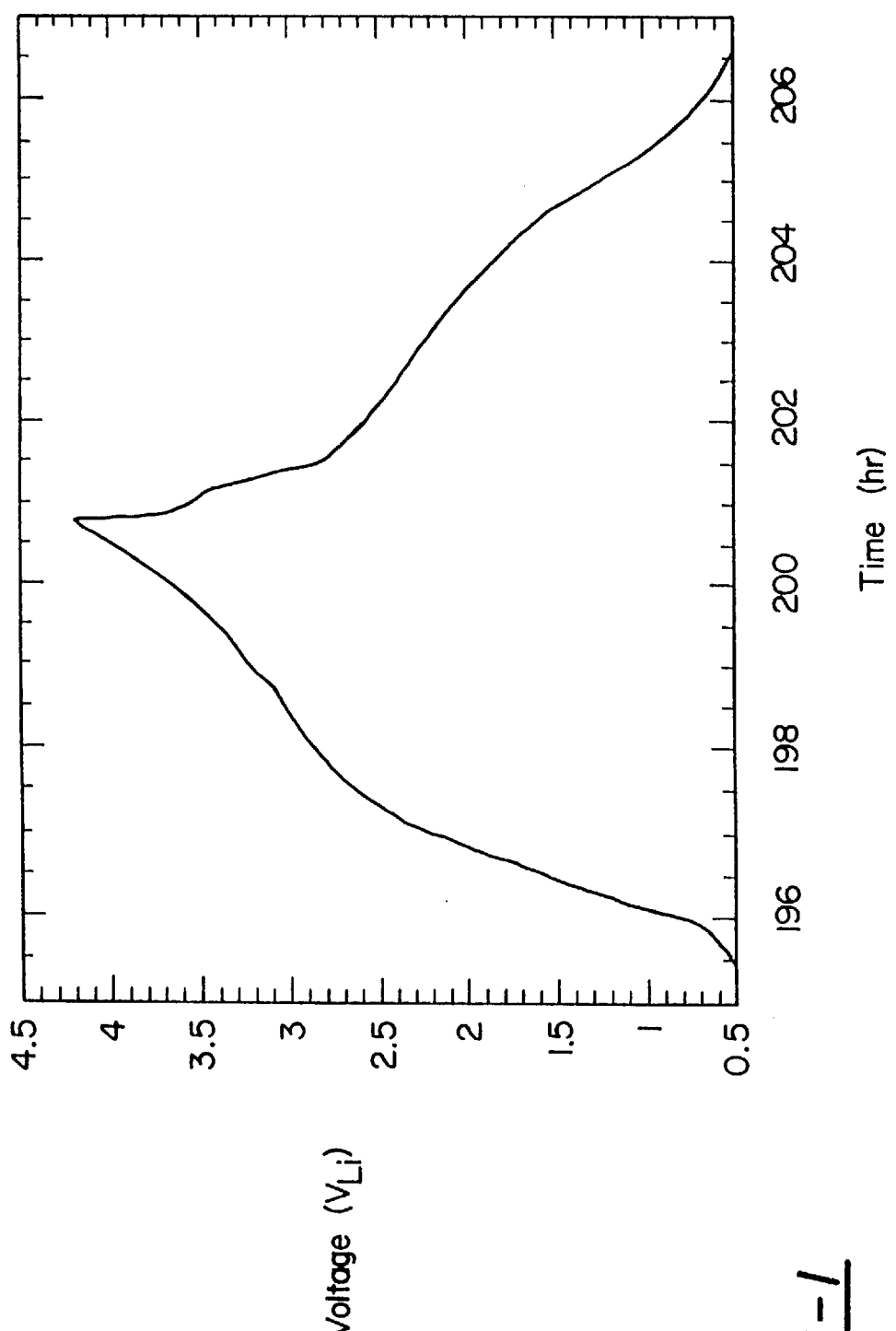
FIG. 1 is a graph illustrating the behavior of a vanadium nitride electrode on cycling between 0.5 and 4.2 volts utilizing charging and discharging currents.

The present invention is directed to non-oxide, transition metal based ceramic materials as well as to methods for manufacturing such materials and devices made from the materials. The materials of the present invention are comprised of a transition metal together with one or more of: N, C, B and Si. The materials of the present invention readily intercalate group IA elements, as for example during the charging and discharging of a battery electrode. Therefore, in accord with the present invention, the materials can also include a group IA element therein; although, in some instances, as for example when a battery electrode is being fabricated or operated, the material may not include a group IA element therein.

Most preferably, the general formula for the materials of the present invention can be represented as $A_yM_2Z_x$, wherein A is a group IA element, M is a transition metal, and Z is N, C, B, and Si, and in which $x \leq 2$ and $y \leq 6-x$.

Most typically the group IA element comprises hydrogen, lithium, sodium or potassium; and in some particularly preferred embodiments, the group IA element is lithium. In some other instances, the group IA element will preferably be hydrogen, particularly when the resultant material is being utilized for electrochemical applications as for metal hydride batteries. The transition metal component of the material may comprise a single transition metal as well as a mixture of transition metals. Among some of the more preferred transition metals are the early transition metals, that is to say metals from groups IIIB–VIIB. It has been found that metals from groups IVB–VIB have some particular utility in the practice of the present invention.

The transition metals typically manifest a cubic, tetragonal or hexagonal crystalline structure, and in the materials of the present invention, the crystalline lattice of the transition metal is preserved, and the remaining elements thereof are disposed interstitially in the lattice. While the interstitial elements may create some lattice distortion, it has been shown by x-ray diffraction that the general lattice structure is preserved. Typically, the group IA element occupies tetrahedral and/or octahedral interstitial sites while the hydrogen, carbon, boron and/or silicon occupies octahedral sites.

A variety of techniques may be employed to fabricate the materials of the present invention. In one particular group of processes, the materials may be fabricated by using an electrochemical potential to insert the group IA element into the remaining elements of the material. For example, an electrochemical cell may be configured to include an electrode fabricated from a transition metal compound such as $Mo_2N$ as a cathode of the cell, and a body of lithium metal as the anode. Charging of the cell will occur by insertion of lithium into the lattice of the $Mo_2N$; and similar results may be obtained utilizing other elements.

Reaction may also be carried out in the absence of any externally applied electrical field by chemical reaction of the various materials. In one group of chemical reactions, an intermediate reactant which comprises a compound of the group IA element and the transition metal is reacted with another reagent to produce the final compound. For example, $LiMoO_4$ or $LiVO_3$ may be reacted with ammonia at an elevated temperature so as to displace oxygen and incorporate nitrogen therein. In another group of chemical reactions, a further displacement reaction may be carried out wherein nitrogen is replaced by carbon in a high temperature carburizing reaction by utilizing a carbon containing gas such as $CH_4$. Similarly, $SiH_4$, $B2H_6$, and the like may be reacted with a variety of materials to produce the compositions of the present invention.

In another group of chemical reactions, an intermediate compound which includes a transition metal is reacted with a reagent which contains a group IA element and N, C, B, Si. For example, a transition metal halide may be reacted with a nitride of a group IA element to produce the compounds of the present invention.

The materials of the present invention are not restricted to any particular method of fabrication. Other reactions will be apparent to those of skill in the art, in view of the teaching presented herein. For example, organometallic compounds may be employed to insert lithium or other group IA elements into a material. Treatment with activated hydrogen, as for example in a hydrogen plasma, or treatment with high pressure hydrogen, may be employed to insert hydrogen into the matrix.

The unique configurations and compositions of the materials of the present invention provide physical and electronic properties which make them useful in a variety of applications. For example, the materials of the present invention have significant utility as electrodes of the type utilized in batteries, capacitors and the like, and have been found to have particular advantage as electrochemical electrodes for lithium ion and lithium polymer batteries. The materials of the present invention also have utility as electrodes for other processes such as the electrosynthesis of chemical products. These materials may be also employed as catalysts, either in the presence of an applied electrical field, or as strictly chemical catalysts. The unique electronic properties of these materials also present a number of opportunities for their use as components of semiconductor devices.

EXAMPLES

The principles of the present invention will be illustrated by the following examples, it being understood that the invention is not limited thereto.

Example 1

A lithium molybdenum nitride material was prepared by a solid state, temperature programmed reaction in which $Li_2MoO_4$ was reacted with $NH_3$. Approximately 1 gram of $Li_2MoO_4$ was placed in an alumina boat inside a quartz reactor tube. Ammonia gas was flowed over the material at a flow rate of approximately 100 cc/min, and the temperature of the material was increased at a heating rate of 350° C./hr to 400° C., and then at a heating rate of 60° C./hr to a final reaction temperature of approximately 700° C. The reactants were then held at this temperature for approximately 60 minutes and then allowed to cool to room temperature while maintaining the flow of ammonia. The cooled material was then exposed to an atmosphere comprising approximately 1% oxygen in helium for approximately 15 minutes in order to inhibit bulk oxidation of the material. The resultant material is a compound characterized as $Li_2MoN_x$. The product was analyzed by x-ray diffraction, and since scattering by lithium and nitrogen is insignificant compared to that of the transition metals, the diffraction pattern was dominated by the lattice structure of the molybdenum atoms. The lattice parameters were similar to those listed in the reference literature tables for cubic molybdenum nitride and carbide, but did not match exactly. The differences in parameters were statistically significant, and could not be attributed to physical effects including those due to crystalline size and micro strain. The results are consistent with the materials being interstitial compounds having lithium and nitrogen at the interstitial sites of a cubic metal lattice. The lattice structure is face centered cubic or B1 like that of NaCl.

The thus produced lithium molybdenum nitride material was also evaluated coulometrically. The material was incorporated into an electrode which was assembled into a cell with a lithium metal counter electrode. The cell was charged at constant current which resulted in a transfer of lithium from the lithium molybdenum nitride cathode to the lithium metal anode. The amount of lithium transferred was calculated by integrating the current to determine the total amount of charge transferred, assuming Z=1 for lithium ions.

Example 2

In this example, a lithium vanadium nitride material was prepared by a solid state, temperature programmed reaction between $LiVO_3$ and ammonia, in a procedure generally similar to that described hereinabove. Specifically, one gram of $LiVO_3$ was placed in an alumina boat inside a quartz reactor tube, and ammonia flowed thereover at a rate of 100 cc/min. The temperature was increased linearly from room temperature to a final reaction temperature of approximately 600° C., at a rate of approximately 300° C. at a rate of 250° C./hr and then 60° C./hr. The reactants were held at the final temperature for approximately 60 minutes, and then cooled to room temperature under a flow of ammonia, and subsequently exposed to a mixture containing 1% oxygen in helium for approximately 15 minutes in order to inhibit bulk oxidation of the material. The product was analyzed by x-ray diffraction, and the results are consistent with the material being an interstitial compound of lithium and nitrogen in the interstitial sites of a cubic metal lattice. The structure of the resultant material is face centered cubic or B1 like that of NaCl. The thus produced product was also evaluated coulometrically, as in the foregoing example, and it was noted that when it was made the cathode of an electrochemical cell, lithium was transferred from the cathode to an anode, when the cell was charged at constant current.

Example 3

In this example, lithium vanadium nitride materials are prepared from a gelled precursor. The gelled precursor is prepared by hydrolysis of a mixture of lithium and vanadium alkoxides by water, in an alcoholic solvent with an acid or base catalyst. Common alkoxides of the metals, such as ethoxides, methoxides and isopropoxydes may be employed, and the lithium vanadium ratio controlled by adjusting the relative amounts of the precursors. Hydrolysis is effected by water in the alcohol solvent, and the ratio of water to alkoxides should be near stoichiometric to cause complete hydrolysis of the alkoxide mixture. Hydrolysis produces a gelled microstructure. The solvent may be extracted from the gel, at ambient pressure to produce a high surface area xerogel material. Alternatively, supercritical extraction may be employed to produce an aerogel material. The resultant gels are calcined at approximately 400°–500° C. for 3 hours to produce a lithium vanadium oxide structure, which is subsequently reacted as in the foregoing experiment to produce a high surface area lithium vanadium nitride material.

It is to be noted that many of the oxide or nitride materials prepared according to these examples may be converted to a corresponding carbide material by a high temperature carburization process carried out at elevated temperature, and under an atmosphere of a carbon containing material such as $CH_4$.

Example 4

In this example, an electrochemical reaction was employed to convert a molybdenum nitride film into a lithium molybdenum nitride material. In a first stage of the preparation, a molybdenum oxide film was prepared on a titanium foil substrate. In order to prepare the oxide, an aqueous solution of ammonium paramolybdate was dissolved in distilled water and acidified with 10% nitric acid. The resultant solution was sprayed onto a heated titanium foil, using an ultrasonic nebulizer. The coating was converted to $MoO_3$ by calcination in stagnant air for 30 minutes at a temperature of approximately 450° C. The oxide film was then converted to a nitride, by treatment with ammonia at an elevated temperature. The molybdenum oxide was quickly heated to approximately 350° C. in a quartz tube furnace under a flow of approximately 100 cc/m of ammonia. The temperature was then increased to approximately 450° C. at a rate of 40° C./min, and subsequently to 700° C. at a rate of 200° C./min, and held constant thereat for approximately one hour. The material was then cooled to room temperature under ammonia flow, and passivated in a flowing mixture of 1% oxygen in helium for one hour so as to produce a molybdenum nitride film.

The molybdenum nitride film was then assembled as the cathode of an electrochemical cell which included a lithium anode. Under constant current conditions a potential was applied between the anode and cathode, and lithium ions generated at the anode were transported to and inserted into the cathode to form lithium molybdenum nitride. As noted above, carbide materials may be prepared from the nitride by appropriate carburization steps, either before or after formation of the lithium compound. In one carburization process, the nitride is heated in methane, at a linear rate, from room temperature to 425° C. over one hour, and then raised to a temperature of 650° C., at a linear rate, over 6.5 hours and held at 650° C. for one hour. Alternatively, the oxide may be directly reacted with methane or methane and hydrogen.

Example 4A

In this example a vanadium carbide material was prepared and lithium inserted thereinto via an electrochemical reaction. In a first stage of the preparation, a vanadium oxide film was prepared on a titanium foil by spraying an aqueous solution of $NH_4VO_3$ onto a heated titanium foil, and calcining the salt in stagnant air for one hour at 420° C. to produce a $V_2O_5$ film. The oxide film was converted to the carbide by treatment with methane at elevated temperature. Methane was flowed over the sample at 100 cc/min, and the sample first heated, at a linear rate, from room temperature to 300° C. over 30 minutes. The temperature was then linearly increased to 921° C. over 207 minutes, and held thereat for 15 minutes. (In an alternative run, the second heating was from 300° C. to 870° C. over 9.5 hours, with a 15 minute soak at 870° C.) After carburization was complete, the samples were cooled to room temperature under methane and passivated for one hour in a 1% mixture of oxygen in helium.

Example 5

In this example, the compounds of the present invention are formed by chemical reaction between $Li_3N$ and transition metal halide compounds. For example, compounds may be prepared by reacting transition metal halide with $Li_3N$ in benzene, in a high pressure vessel, under an argon atmosphere, at a temperature of approximately 200° C. to 400° C. for 6 to 12 hours. Reactions under conditions of this type produce a precipitate which may be collected and washed with dry ethanol to remove any resultant lithium halide salts. The final product is dried under vacuum for approximately 2 hours at 100° C. to remove residual solvent. The final composition of the product will depend upon the amount of lithium reagent in the starting mixture, since the lithium will apportion between the products and reactants according to the concentrations and thermodynamic stability of the compounds. In another variation of the foregoing, organolithium compounds such as n-butyl lithium may be added to the initial reactants. During and subsequent to the thermal synthesis of the metal nitride, lithium is transferred from the organolithium and inserted so as to form the lithium metal nitride compound. This synthetic approach is attractive since it generally requires somewhat lower processing temperatures than temperature programmed nitridation reactions as described above.

Example 6

Sodium based transition metal ceramics may also be prepared in accord with the foregoing procedures, as will be readily apparent to one of skill in the art. These materials may be used as prepared, or sodium ions may be exchanged with lithium ions to form a lithium based material. Such ion exchange reactions may be carried out in excess of molten lithium nitrate for approximately 6 hours at a temperature of 250° C. to 300° C. Ideally, the procedure is repeated several times to ensure complete ion exchange. By first building the host lattice with sodium ions and subsequently exchanging them for smaller lithium ions, higher ionic diffusivity will result.

Example 7

In another experimental series, metal nitride or metal carbide precursor compounds are prepared in accord with the procedure of Example 4, and converted to the corresponding lithium containing materials by a chemical process. In this procedure, the metal nitrides or metal carbides are stirred for several days under argon in a solvent containing an organolithium compound, as for example in a hexane solution of n-butyl lithium. The resultant products are recovered and washed in hexane and dried in vacuum. They may be annealed to improve crystallinity.

Example 8

In this example, lithium molybdenum nitride was fabricated into a cathode of a battery. The material was prepared from high surface area (greater than 5 $m^2/gr$) lithium molybdenum nitride powder prepared in accord with the general procedure detailed with regard to Example 4. The powder was mixed with about 10% by weight of a Teflon binder to form an aqueous suspension, and the electrode/binder mixture blended for 2 minutes with isopropanol added as needed to maintain liquid consistency. The electrode/binder mixture was separated from the liquid by filtration, and kneaded and rolled into progressively thinner cakes so as to form a layer of approximately 0.010–0.015 inch thickness. Nickel mesh was pressed into the layer and the mesh/electrode/binder mixture consolidated by uniaxial pressing at approximately 10,000 psi. The resulting electrode was dried for approximately 6 hours at 120° C. to remove isopropanol and water. The still warm electrode was transferred into a dry box and used to assemble a test cell. The anode of the test cell was lithium foil and the electrolyte was 1M $LiPF_6$ in 1:1 propylene carbonate/ ethylene carbonate. A porous polypropylene paper was used to separate the electrode from the lithium foil, and constant current charging and discharging experiments were performed.

The test results showed that the resultant cell manifested reproducible and reversible energy storage, and the shape of the charge and discharge curves suggest that lithium ions are inserted into the high surface area electrode material. Specifically, the voltage change with time (under constant current) was nonlinear. The relationship between voltage and time is typically linear for charged storage via double layer formation. Ion insertion was also inferred from the measured capacitances. Results at larger charging currents were also consistent with the energy storage process being based on mechanisms other than electrochemical double layer charging. The charge storage capacity for the electrode material was 119 mAh/g. The theoretical capacity corresponding to inserting one half equivalent of lithium per molybdenum atom is 126 mAh/g. This capacity is consistent with the reversible lithium ion occupation of one half of the octahedral lattice sites, while the other half of the octahedral sites are permanently occupied by nitrogen.

Example 9

In this example, an electrochemical cell was prepared utilizing a high surface area of vanadium nitride material as an electrode. The vanadium nitride material was prepared in accord with the general procedure set forth in Example 4A, and had a surface area of approximately 28 $m^2/gr$. Electrodes and test cells were fabricated according to the methods of Example 8. FIG. 1 illustrates the behavior of the vanadium nitride electrode on cycling between 0.5 and 4.2 volts utilizing charging and discharging currents. The test results show reproducible and reversible energy storage consistent with the insertion of lithium ions into the electrode material. Ion insertion was also inferred from the measured specific capacitances of the electrode. Typical double layer capacitances are in the range of 1–100 microfarad per $cm^2$ (usually at the lower end for aprotic electrolytes). Equivalent capacitances in excess of 390 microfarad per $cm^2$ were observed at the lower charging currents for the present electrodes. Results at the higher charging currents are also consistent with the energy storage process being based on mechanisms other than electrochemical double layer charging.

Figure 2:
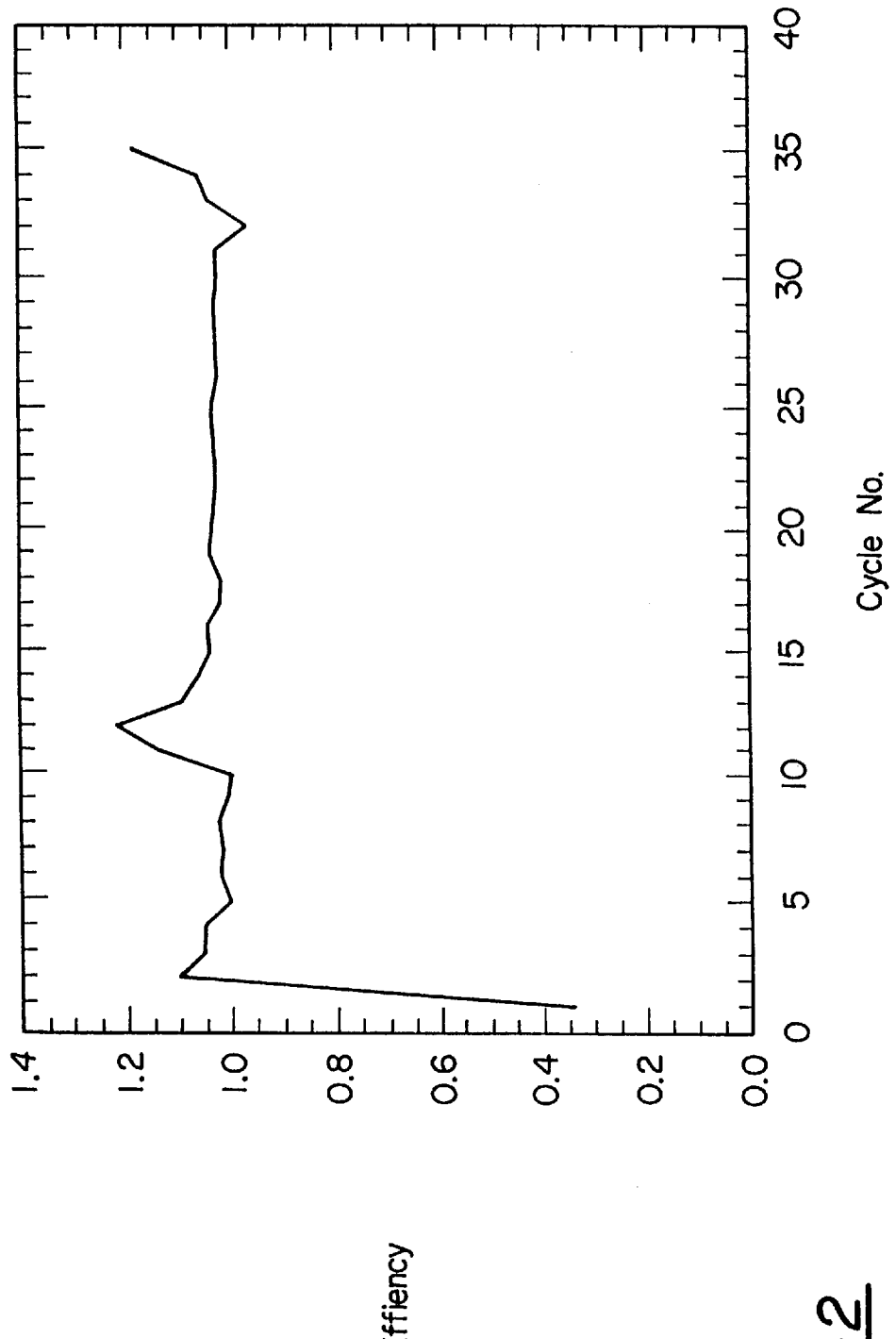
FIG. 2 is a graph illustrating the coulombic efficiency of vanadium nitride.

The electrode area and vanadium nitride loading were 0.6 $cm^2$ and 26 mg respectively corresponding to current densities of 0.5–8.0 $mA/cm^2$ and 12–183 mA/gr. The coulombic efficiency for the charge/discharge was high and reproducible over extended cycling as shown in FIG. 2. The capacity was greater than 1 mA/hr for a current density of 0.5 $mA/cm^2$ yielding an energy density of greater than 90 Wh/kg. Corresponding average power density was 27 W/kg. Table 1 summarizes the results for this experiment. Additional experiments demonstrate that the subject electrode is stable up to 4.2 volts. Charge storage capacities of up to 150 mAh/g were observed for this material, and the theoretical capacity for this material (corresponding to insertion of one half equivalent of lithium per vanadium atom) is 218 mAh/g.

TABLE 1

| Charging/Discharging Current (mA) | Energy Density (Wh/kg) | Average Power Density (W/kg) |
| --- | --- | --- |
| 0.3 | 94.9 | 27.1 |
| 0.6 | 74.6 | 54.2 |
| 1.25 | 56.5 | 113.0 |
| 2.4 | 36.2 | 217.0 |
| 4.75 | 7.2 | 429.3 |

Example 10

In this experiment, a test cell was assembled utilizing high surface area (greater than 5 $m^2/gr$) vanadium carbide powders as starting material for electrodes. The vanadium carbide was prepared in a procedure generally similar to that set forth in Example 4, and electrodes of test cells fabricated according to the methods of Example 8.

Figure 3:
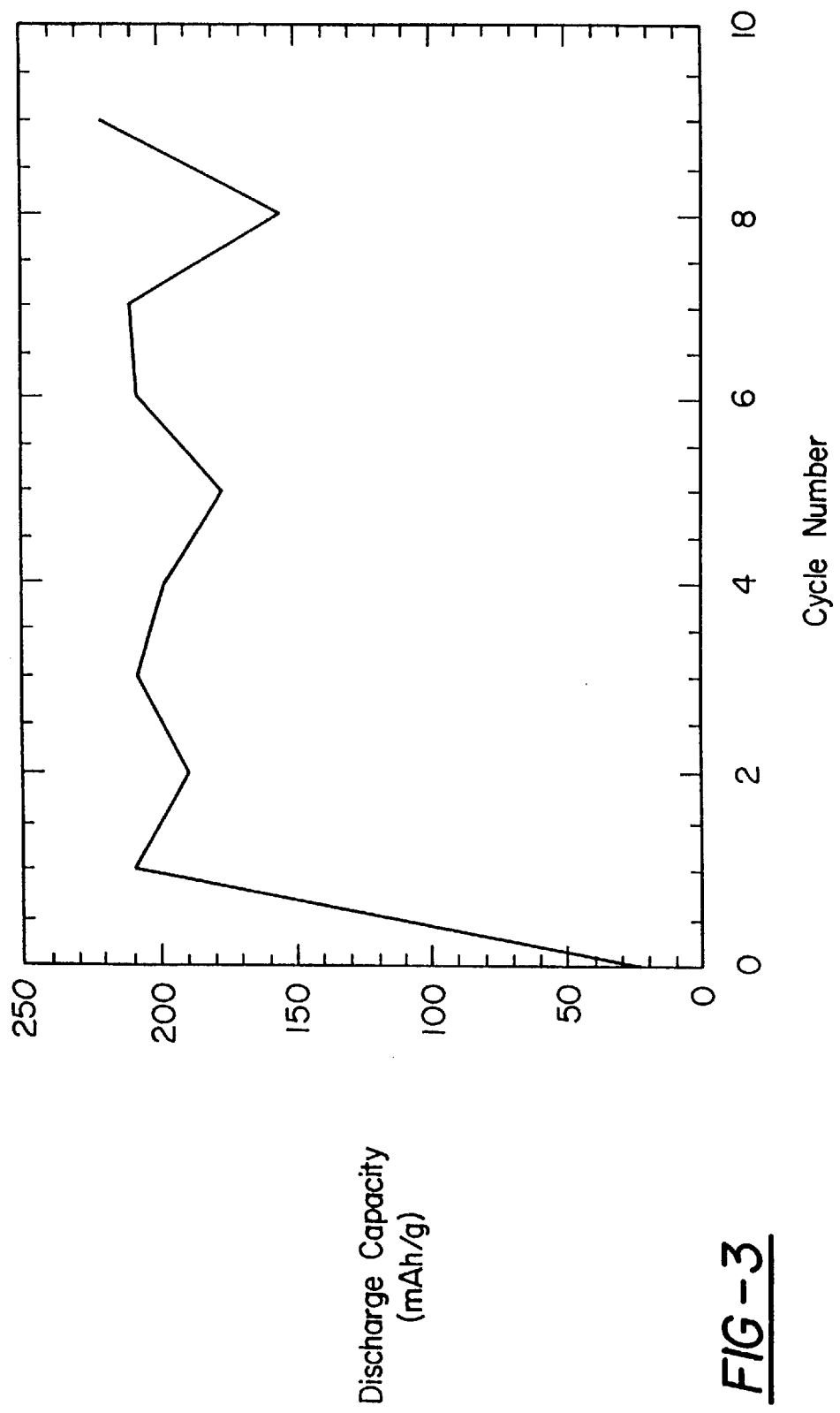
FIG. 3 is a graph illustrating the behavior of a vanadium carbide electrode on cycling between 1.0 and 3.7 volts using charging/discharging rates of approximately C/3.

This experimental series showed that the electrode provided for reproducible and reversible energy storage consistent with insertion of lithium ions thereinto. FIG. 3 illustrates the behavior of the electrode on cycling between 1.0 and 3.7 volts using charging/discharging rates of approximately C/3. Ion insertion is also inferred from the measured specific capacitance of the electrode, which was in excess of 300 microfarad/cm$^2$ at low charging currents. Capacitances at higher currents were also consistent with an energy storage process which is not based on double layer charging. The capacity was in excess of 200 mAh/g, with the theoretical maximum being 222 mAh/g (assuming occupancy of one-half of the octahedral sites by lithium, with the other half of the sites being occupied by carbon).

The foregoing examples are illustrative of particular aspects of the present invention, but are not meant to be limitations upon the practice thereof. Yet another embodiments of the present invention may be readily implemented. For example, the materials of the present invention, particularly when fabricated in high surface area morphologies, can be used as electrodes for electrochemical, double layer capacitors. Upon polarizing such an electrode, in an electrolytic medium, capacities in the range of 1–50 microfarad per cm$^2$ of surface area are obtained. The presence of lithium or other group IA elements will further improve the open circuit potential and stability of the capacitors.

Electrodes based on titanium or solid solutions including titanium in substantial atomic fractions are very attractive due to their low cost and low mass density. For example, the theoretical gravimetric charge storage densities of lithium titanium carbide is greater than 230 mAh/g, which is substantially higher than presently favored cobalt, nickel or manganese oxide electrode materials. In accord with the present invention, group IV carbide or nitride materials may be employed to form interstitial lithium containing compounds. In order to optimize the crystal structure of the group IV element containing materials, dopants or crystal structure stabilizing materials may further be included in the material. For example, the inclusion of vanadium and/or molybdenum in the host lattice material will facilitate the formation of crystalline lattices which form interstitial compounds with group IA elements, since phase diagrams indicate that these two metals form a continuous series of solid solutions with group IV metals. Hence, in accord with the present invention, the gravimetric charge of storage density of electrochemical devices may be enhanced by combining metals to form a solid solution, interstitial lithium metal compound. The addition of yet other elements can lead to improved microstructural properties through the creation of larger pores and higher concentrations of defects, both of which may enhance the ionic diffusivity in these materials. Adding other metal atoms as dopants offers additional promise of enhancing the energy density by increasing the free energy associated with the insertion reaction.

While the foregoing examples primarily describe the use of the materials of the present invention as cathodes of electrochemical cells, in some instances, the materials of the present invention may also have utility as anodes of electrochemical cells. For example, it has been found that host materials in which lithium occupies energy levels closer to that of elemental lithium are best suited for anode materials, and the materials of the present invention intercalate lithium in low energy states. In yet other instances, the materials of the present invention are useful as additives to enhance the conductivity of lithium ion battery electrodes. Commercial electrodes are fabricated from lithiated metal oxides based on nickel, cobalt or manganese. Because the intrinsic conductivity of these materials is low, the electrodes utilized in commercial batteries generally require the addition of carbon or other additives to enhance their electrical conductivity. Such materials are typically present in volume fractions of 10% or more. Such conductivity enhancing additives do not participate in energy storage and thus represent parasitic mass. The nitride and carbide materials of the present invention have higher conductivity than carbon and furthermore can participate in energy storage. Therefore, these materials may be incorporated into conventional lithium batteries as conductivity enhancers.

As noted above, the electrochemical potential of the materials of the present invention can be controlled by varying their stoichiometry. This is important, since in many prior art cathode materials, lithium insertion occurs at a relatively constant potential, hence such cells give no indication of impending depletion of charge or overcharging. Hence, such prior art cells can often produce unexpected power losses, or may be inadvertently overcharged, or over discharged, since the state of their charge cannot be readily measured.

The materials of the present invention can be made to manifest an electrochemical potential which varies with the state of charge, hence such materials may be incorporated into a storage battery, either as an electrode, or as an electrode additive, and when this is done, the resultant cell will provide a charge/discharge potential profile which is indicative of the state of its charge. Therefore, such cells can be made to effectively signal their state of charge so as to allow for control of charging and discharging.

While the foregoing examples have primarily been directed to the insertion of sodium and lithium into the materials of the present invention, protons may be similarly inserted into these materials, as for example by using methods corresponding to those set forth in Example 6. Such hydrogen containing materials have widespread use as metal hydride battery electrodes, hydrogen storage materials and hydrogenation catalysts.

It will be appreciated from the foregoing, that the present invention provides for the synthesis of a wide variety of unique materials having electrical, chemical and electrochemical properties which may be readily controlled and tailored. The materials of the present invention are based upon a crystalline lattice structure determined by one or more host transition metals. The materials of the present invention can readily accommodate, and release, hydrogen, lithium, sodium, potassium and other group I elements. Hence, the materials of the present invention can be custom tailored for particular applications. The foregoing examples have described some particular embodiments and applications of the materials of the present invention. In view of the teaching presented herein, one of skill in the art will readily appreciate that other modifications, variations and embodiments may be implemented in accord with the present invention. Therefore, the foregoing is illustrative of the present invention, but is not to be a limitation upon the practice thereof. It is the following claims, including all equivalents, which define the scope of the invention.

We claim:

1. A transition metal based ceramic material having the general formula: $A_yM_2Z_x$, wherein A is a group IA element, M is a transition metal having a cubic, tetragonal or hexagonal crystalline lattice, and Z is a member selected from the group consisting of: N, C, B, Si, and combinations thereof; wherein $x \leq 2$, $y \leq 6-x$, and wherein A and Z occupy interstitial sites in said lattice.

2. A material as in claim 1, wherein A is lithium.

3. A material as in claim 1, wherein M is a transition metal selected from groups IVB–VIB of the periodic table.

4. A transition metal based ceramic material having the general formula: $A_yM_2Z_x$, wherein A is a group IA element, M is a transition metal selected from groups IIIB–VIIB of the periodic table, and Z is a member selected from the group consisting of: N, C, B, Si, and combinations thereof; wherein $x \leq 2$ and $y \leq 6-x$.

5. A material as in claim 4, further characterized in that said material has a cubic, tetragonal or hexagonal lattice structure.

6. A material as in claim 4, wherein said transition metal has a cubic, tetragonal or hexagonal crystalline lattice and wherein A and Z occupy interstitial sites in said lattice.

7. A material as in claim 4, wherein A is lithium.

8. A material as in claim 4, wherein M is a transition metal selected from groups IVB–VIB of the periodic table.

9. A material as in claim 4, wherein M comprises a plurality of transition metals.

10. A transition metal based ceramic material having the general formula: $A_yM_2Z_x$, wherein A is a group IA element, M comprises a plurality of transition metals, and Z is a member selected from the group consisting of: N, C, B, Si, and combinations thereof, wherein $x \leq 2$ and $y \leq 6-x$.

11. A material as in claim 10, further characterized in that said material has a cubic, tetragonal or lattice structure.

12. A material as in claim 10, wherein said transition metal has a cubic, tetragonal or hexagonal crystalline lattice and wherein A and Z occupy interstitial sites in said lattice.

13. A material as in claim 10, wherein A is lithium.

14. A material as in claim 10, wherein M is a transition metal selected from groups IIIB–VIIB of the periodic table.

15. A material as in claim 10, wherein M is a transition metal selected from groups IVB–VIB of the periodic table.

16. A method for making a material of the general formula $A_yM_2Z_x$, wherein A is a group IA element, M is a transition metal and Z is a member selected from the group consisting of: N, C, B, Si, and combinations thereof, wherein $X \leq 2$ and $Y \leq 6-x$, said method including the steps of:

providing an intermediate of the general formula $M_2Z_x$; and electrochemically adding a group IA element thereto.

17. A method as in claim 16, wherein said step of electrochemically adding said group IA element comprises:

making said $M_2Z_x$ the cathode of an electrochemical cell;

making said IA element a component of the anode of said electrochemical cell; and passing current through said electrochemical cell, whereby said group IA element is inserted in said $M_2Z_x$ intermediate so as to provide a material of the formula $A_yM_2Z_x$.

18. A method of making a material of the general formula $A_yM_2Z_x$, wherein A is a group IA element, M is a transition metal and Z is a member selected from the group consisting of N, C, B, Si, and combinations thereof; wherein $x \leq 2$ and $y \leq 6-x$, said method including the steps of:

providing an intermediate reactant which comprises a compound of said group IA element, A, said transition element, M, and another element, D, which is different from A and M; and chemically reacting said intermediate with a reagent containing an element Z as set forth above, so as to convert said intermediate to said material having the general formula $A_yM_2Z_x$.

19. A method as in claim 18, wherein D is oxygen, and said reagent is ammonia.

20. A method as in claim 18, wherein D is oxygen or nitrogen and wherein said reagent is a hydrocarbon.

21. A method of fabricating a transition metal based ceramic material having the general formula $A_yM_2Z_x$, wherein A is a group IA element, M is a transition metal, and Z is a member selected from the group consisting of: N, C, B, Si, and combinations thereof; wherein $X \leq 2$ and $Y \leq 6-x$, said method including the steps of:

providing an intermediate compound which includes said transition metal therein; and reacting said intermediate compound with a reagent which contains said group IA element and said member Z so as to convert said intermediate compound to said material having the general formula $A_yM_2Z_x$.

22. A method as in claim 21, wherein said intermediate is a transition metal halide.

23. A method as in claim 22, wherein said reagent is a nitride of a group IA element.

* * * * *